Jan. 10, 1967  W. E. SCHWERDTFEGER  3,297,145
DIVERTER FOR CONVEYOR
Filed April 9, 1964  2 Sheets-Sheet 1
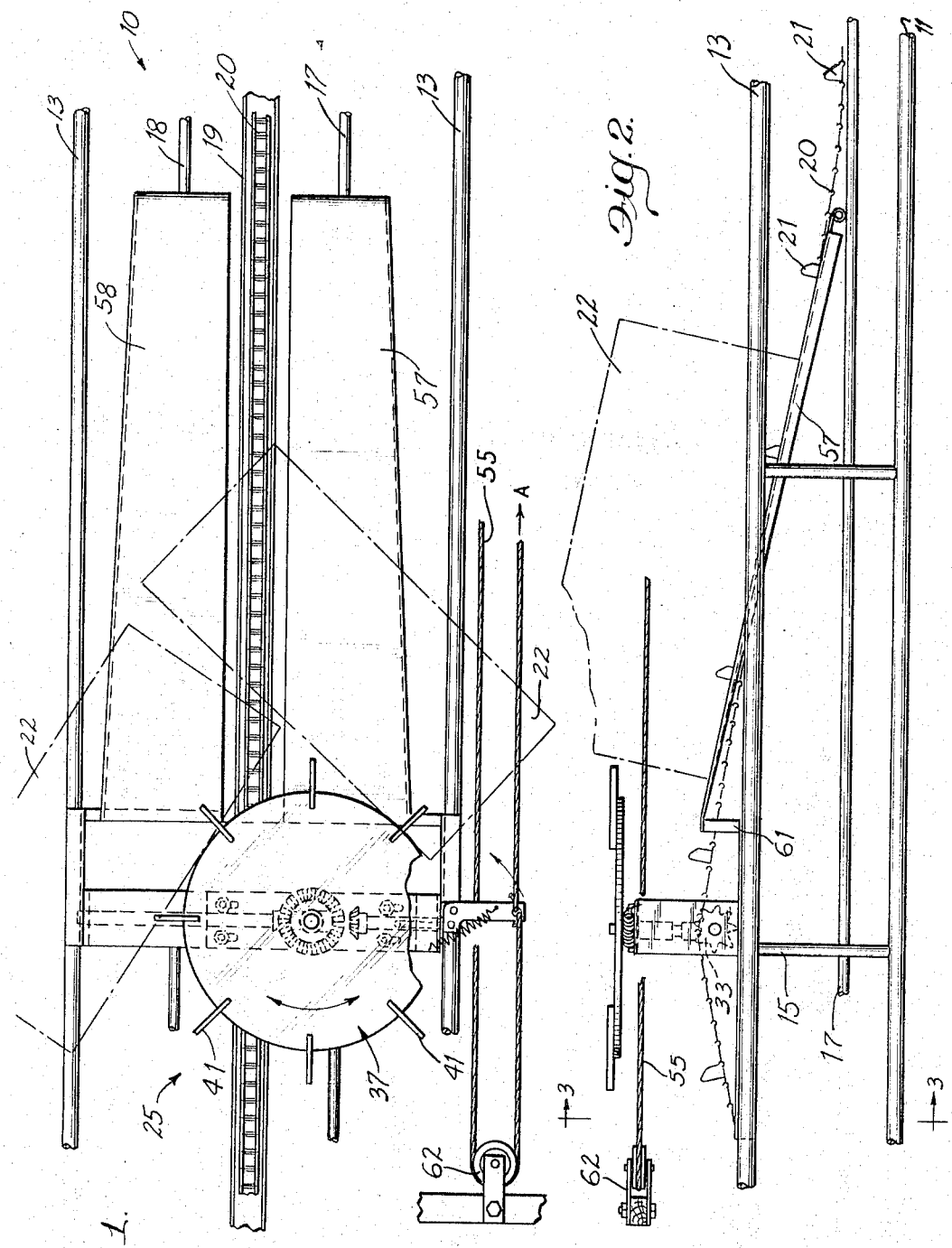
Inventor:
Wilbur E. Schwerdtfeger
By
Ralph Alvey Atty.

Jan. 10, 1967   W. E. SCHWERDTFEGER   3,297,145
DIVERTER FOR CONVEYOR
Filed April 9, 1964   2 Sheets-Sheet 2
Fig. 4.
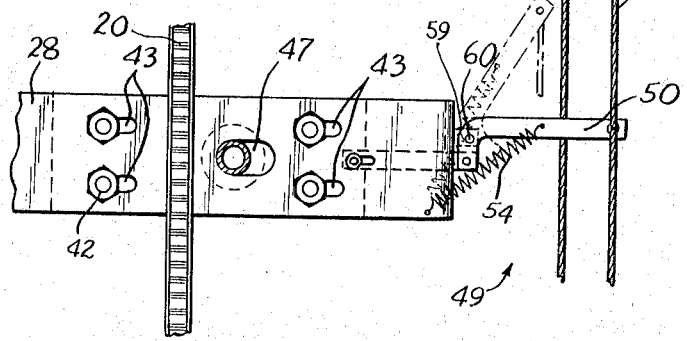
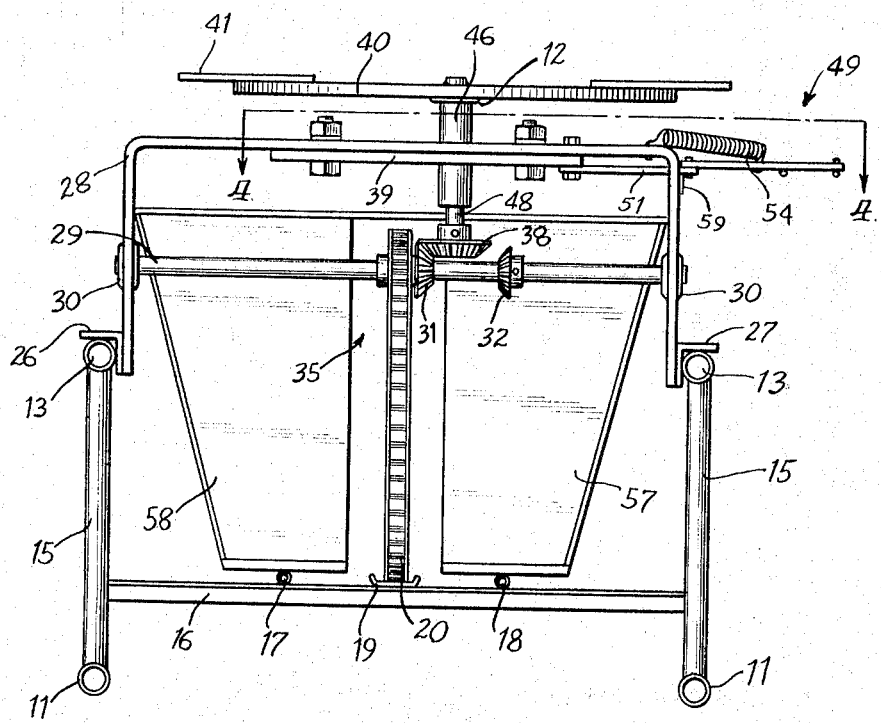
Fig. 3.
Inventor:
Wilbur E. Schwerdtfeger
By:
Ralph Alvey  Atty.

United States Patent Office 3,297,145
Patented Jan. 10, 1967

3,297,145
DIVERTER FOR CONVEYOR
Wilbur E. Schwerdtfeger, Western Springs, Ill., assignor to International Harvester Company, Chicago, Ill., a corporation of Delaware
Filed Apr. 9, 1964, Ser. No. 358,535
7 Claims. (Cl. 198—185)

This invention pertains to a diverter for a conveyor, that is, to a rotary mechanism for dumping cargo off the side of a conveyor.

The shortage of farm labor and the continuous rise in farm wages have encouraged farmers to use conveyors for moving bales of hay into a barn for storage. In general, an inclined conveyor or elevator raises the bales to the barn loft, and a horizontal conveyor carries the bales to the desired point in the barn, where they are mechanically dumped from the conveyor to the floor below. It is with the dumping operation of the conveyor that this invention is concerned.

If the bales are to be dumped in uniform piles along both sides of the conveyor, the mechanical dumping device (i.e. diverter) must be positively driven, must be movable along the conveyor and, also, must be reversible, so as to dump bales off either side of the conveyor. For convenience and safety, some form of remote control for positioning and reversing the diverter must be provided at ground level.

The general object of this invention is, therefore, to provide a bale diverter for a converter embodying the above attributes. Specifically, the objects are as follows: First, to provide a continuously driven rotating diverter for positively dumping objects such as bales off a horizontal conveyor. Second, to provide a bale diverter having a remote control for repositioning the diverter along the conveyor. Third, to provide a bale diverter capable of diverting bales or similar objects to both sides of a conveyor.

The best mode contemplated for carrying out the present invention is shown in the drawings where:

FIG. 1 is a top plan view of the novel diverter mounted upon a horizontal conveyor;

FIG. 2 is a side elevation of the diverter of FIG. 1;

FIG. 3 is an end elevation of the diverter, taken on line 3—3 of FIG. 2; and

FIG. 4 is an enlarged view of the bellcrank mechanism for reversing rotation of the rotary diverter disk, taken on line 4—4 of FIG. 3.

One type of a mechanical bale handling installation comprises (FIGS. 1-3) a horizontal chain-type conveyor assembly 10 and a rotary bale diverter assembly 25. The horizontal conveyor carries the bales to the desired unloading station, where the bale diverter is located. The diverter then forces the bales off of the conveyor.

The horizontal chain-type conveyor 10 comprises (FIGS. 1-3) a pair of longitudinal pipe bases 11, a plurality of pipe posts 15 projecting upwardly at corresponding points on each of the bases, and a pair of longitudinal pipe railings 13 supported on the pipe posts, the posts 15 being attached at their respective ends to the base 11 and the railing 13. Angle iron cross-brace members 16 connect the corresponding posts of each side of the horizontal conveyor. Members 16, in turn, support the longitudinal pipe tracks 17 and 18, along which the bales slide, and an upwardly facing channel section 19, in which the conveyor chain 20 travels. Chain 20 is a conventional endless chain conveyor, extending the length of the horizontal conveyor and back, in the course of which it loops around a sprocket (not shown) at each end of the conveyor. Teeth 21, located at intervals along the chain, point upward with respect to the top run of the chain and penetrate any bales placed on tracks 17 and 18. When chain 20 is driven (e.g. by power supplied at one of the above-mentioned sprockets), it imparts motion to the bales through the medium of teeth 21.

The rotary bale diverter assembly 25 comprises a frame assembly 28, a rotary disk or wheel assembly 37 for diverting the bales, a bellcrank mechanism 49 for changing the direction of rotation of the rotary disk, and a gear drive mechanism 35 for transferring power from the chain 20 to the rotary disk. A detailed description of these components follow.

Diverter frame assembly 28 is supported on the railings 13 of conveyor 10 by the angle iron runners 26 and 27. The sides of these runners extend tangentially (one horizontally and the other vertically) to their respective railings, along the top and inner sides thereof. Projecting upwardly from one of the runners and attached thereto is the inverted U-shaped body member 36. The top, horizontal section of member 36 contains five elongated slots, four of which (i.e. slots 43) guide the nut, bolt, and washer assemblies 42 that hold base plate 39 in place, and one of which (i.e. slot 47) accommodates the bearing sleeve 46. Sleeve 46 extends through base plate 39 and is attached thereto (e.g. by welding), the top of sleeve 46 forming a bearing for rotary disk assembly 37. A second inverted, U-shaped member 61 attached to the other end of runners 26 and 27 supports the bale ramps 57 and 58. The upper ends of ramps 57 and 58 are attached to member 61, while the lower ends rest on tracks 17 and 18 and are slidable therealong. The function of the ramp is to elevate the bales into the line of action of the rotary disk 40 of the rotary disk assembly 37.

In rotary disk assembly 37, a plurality of radial fingers 41 are attached to the periphery of disk or wheel 40, a shaft 48 is attached to the center of the disk, and an annular bearing surface 12 is provided on disk 40 concentric with shaft 48. As shown in FIG. 1, the diameter of disk 37 is less than the width of conveyor 10. By so proportioning the diameter of disk 37, the bale 22 is turned gradually rather than abruptly, as would happen if the diameter of disk 37 were larger than shown. As shown in FIGS. 1 and 3, the vertical axis of rotation of the rotary disk 37 is located a short distance to one side of the centerline of conveyor 10. If the disk 37 were centered on the centerline of conveyor 10, the bales would hit disk 37 head on and stop it. For disk 37 to be effective in diverting the bales, it must be offset as shown. Yet, disk 37 must not be located too far from the centerline of conveyor 10 or it will be less effective in diverting bales to the further side of conveyor 10 than to the nearer side thereof. With shaft 48 journalled in the bearing sleeve 46, bearing surface 12 of disk 40 rides on the top or bearing surface of the sleeve 46. When base plate 39 is moved laterally, bearing sleeve 48 on plate 39 and rotary disk assembly 37 supported on sleeve 48 moves in unison with plate 39. Movement of plate 39 is effected by means of the bellcrank assembly 49.

The primary purpose of bellcrank assembly 49 is to control the direction of rotation of disk 40. The assembly comprises an L-shaped bellcrank 50 pivotally mounted at 60 on a bracket 59 on the side of body member 36. A connecting rod 51 is pivotally connected at one of its ends to a leg of the bellcrank 50 and at its other end to the sliding base 39. Rope 55, attached intermediate one of its runs to the other leg of bellcrank 50, is used to swing crank 50 about its axis 60 and, thereby, to move base plate 39. By looping rope 55 around the pulley 62 (attached to a building support), two runs are provided for swinging crank 50 clockwise or counterclockwise. A coil spring 54, attached at one end to frame 28 and at its other end to bellcrank 50, is arranged so that the line of action of the force it exerts moves from one side to the other of pivot 60 when crank 50 is operated. An overcenter locking action is therefore achieved with spring 54, so that crank 50 is held in either of the two positions shown, respectively, in solid and broken lines in FIG. 4.

Gear drive mechanism 35 provides two-directional rotation of disk 40 and, therefore, bale diversion to either side of the horizontal conveyor 10. The gear drive comprises a drive shaft 29 journalled in bearings 30 supported on the legs of U-shaped frame 36, a sprocket 33 on shaft 29, the sprocket being driven by the chain 20, a pair of bevel gears 31 and 32 on shaft 29, and a bevel gear 38 on the end of shaft 48 normally engaging one of the gears 31 and 32. Gears 31 and 32 are separated by a distance corresponding to the length of travel of slide 39. When crank 50 is pivoted, slide 39 moves gear 38 out of engagement with either gear 31 or 32 and engages it with the other gear of the pair (i.e. gear 31 or 32), thereby causing gear 38 to be driven from a diametrically opposite point and changing the direction of rotation of disk 40.

In operation, chain 20 is driven by a motor or engine (not shown), the contact of chain 20 with sprocket 33 rotating shaft 48 and disk 40. When a bale of hay 22 is placed on the horizontal conveyor 10, teeth 21 penetrate the bale and push it along tracks 17 and 18, the railings 13 providing lateral support for the bale. On reaching the ramps 57 and 58, the bale is elevated into the face of the rotating diverter disk 40, the fingers 41 of the diverter penetrating the bale and pushing it in the direction of rotation of the disk (e.g. in FIG. 1, to the left with clockwise rotation and to the right with counterclockwise rotation). During operation of the diverter, the rope 55 is kept secured to a cleat or the like to hold the diverter assembly 25 in its designated position.

To change the direction of rotation of the disk 40, the disk 40 and ramps 57 and 58 are cleared of any bales that they are conveying. The rope 55 is then loosened and one end pulled to move bellcrank arm 50 into the position desired. As arm 50 pivots, it pushes or pulls, as the case may be, on link 51 to slide the base 39 to one side or the other, base 39 moving with it the sleeve 46, the shaft 48, and the gear 38. Accordingly, gear 38 is disengaged from either bevel gear 31 or 32 with which it happens to be engaged and engaged with the other member of this pair of gears, thereby reversing rotation of disk 40.

To relocate the diverter assembly at a new location further out on the conveyor (i.e. to the left in FIG. 1), the conveyor chain 20 is set in motion, the rope 55 is loosened, and a bale 22 is placed on the conveyor and carried to the diverter assembly 25. Since the diverter assembly is not secured by rope 55, the pressure of bale 22 against the diverter pushes it along the railings 13. When the diverter reaches the desired location, it is stopped and held in this new location by securing the rope 55.

Similarly, to relocate the diverter assembly 25 at a point closer to the loading point of the conveyor (i.e. to the right in FIG. 1, all bales must be cleared from the conveyor and the diverter. After the chain 20 is set in motion, the rope 55 is loosened and pulled in the direction of arrow A in FIG. 1. This pulling force, plus the power transferred by chain 20 to sprocket 33, will cause the diverter assembly to slide along the railings 13 toward the operator. When the diverter assembly reaches the desired position, it is retained thereby again securing the rope 55.

While only the best mode of this invention has been disclosed, the invention embraces, nevertheless, all equivalent forms that fall within the spirit and scope of the attached claims. For example, rollers could be used in lieu of runners 26 and 27, or a spoked wheel could be used instead of the disk 40, or bellcrank 50 could move shaft 29 rather than base 39 without departing from the underlying concept of this invention.

The invention claimed is:
1. A diverter for dumping objects from a conveyor having a longitudinal centerline and lateral bounds defining the width thereof, comprising: an endless member having pusher elements thereon, a frame, means on said frame for supporting it on said conveyor, rotary diverter means for dumping objects from said conveyor, means to disengage the object from the endless member and to elevate the object into the line of action with said rotary diverter means, said rotary diverter means having an axis of rotation and a breadth less than said conveyor width, means mounting said rotary diverter means on said frame and locating said axis of rotation within said lateral bounds of said conveyor and to the side of said longitudinal centerline thereof, drive means on said frame and on said rotary diverter means for selectively rotating said rotary diverter means in one direction or the direction counter thereto, and control means on said frame for effecting said selective rotation of said rotary diverter means.

2. A diverter as recited in claim 1, wherein: said drive means comprises a stub shaft attached at one of its ends to said rotary diverter means along said axis of rotation thereof and rotatably supported on said mounting means, power transmission means on the other end of said stub shaft, a drive shaft rotatably supported on said frame, first drive means for rotating said rotary diverter means in said one direction supported on said drive shaft and adapted to engage said power transmission means, second drive means for rotating said rotary diverter means in said counter direction supported on said drive shaft and adapted to engage said power transmission means, said control means operates one of said power transmission means and said drive shaft to selectively engage one of said drive means with said transmission means.

3. A diverter, as recited in claim 2, wherein: said mounting means comprises a baseplate slidably mounted on said frame transversely thereof and supporting said stub shaft, said baseplate being slidable between two positions in each of which positions said power transmission means engages a different one of said first and said second drive means, and said control means includes a lever mechanism on said baseplate for selectively engaging said power transmission means with each of said drive means.

4. A diverter, as recited in claim 3, wherein: said power transmission means and said first and said second drive means are bevel gears.

5. A diverter, as recited in claim 4, wherein: said lever mechanism is a bellcrank device comprising an L-shaped crank arm pivotally mounted on said frame, a connecting rod pivotally connected at one end to one leg of said L-shaped crank arm and at its other end to said baseplate, and a spring connected to said frame and to the other leg of said L-shaped crank arm.

6. A diverter, as recited in claim 5, wherein: said rotary diverter means is a horizontally disposed wheel with radial fingers projecting from the periphery thereof and the diameter of said wheel is substantially less than said width of said conveyor.

7. A diverter, as recited in claim 6, wherein: a sprocket adapted to engage a conveyor chain is mounted on said drive shaft and a rope for pivoting said crank arm is attached thereto.

References Cited by the Examiner

UNITED STATES PATENTS

| | | | |
|---|---|---|---|
| 720,249 | 2/1903 | Harrison | 198—110 |
| 3,135,376 | 6/1964 | Mayrath | 198—185 |
| 3,139,971 | 6/1964 | Smoker | 198—185 |

FOREIGN PATENTS 80,050  2/1920  Austria.

EVON C. BLUNK, *Primary Examiner.*

RICHARD E. AEGERTER, SAMUEL F. COLEMAN, *Examiners.*